United States Patent [19]

Baker et al.

[11] 4,167,768
[45] Sep. 11, 1979

[54] SINGLE PHASE ELECTRICAL PANELBOARD

[75] Inventors: Andrew P. Baker, Swindon; Peter E. G. Carpenter, Newbury, both of England

[73] Assignee: Square D Company, Park Ridge, Ill.

[21] Appl. No.: 848,060

[22] Filed: Nov. 3, 1977

[51] Int. Cl.² ............................................. H02B 1/04
[52] U.S. Cl. .................................... 361/355; 361/353
[58] Field of Search ................. 339/198 N; 361/346, 361/353–355, 361, 363

[56] References Cited

U.S. PATENT DOCUMENTS

| | | | |
|---|---|---|---|
| 2,738,444 | 3/1956 | Casey | 361/361 |
| 3,172,015 | 3/1965 | Darlow | 361/361 |
| 3,375,411 | 3/1968 | Mrowka | 361/355 |
| 3,541,397 | 11/1970 | Kobryner | 361/363 |
| 3,743,892 | 7/1973 | Fritz | 361/363 |

*Primary Examiner*—Gerald P. Tolin
*Attorney, Agent, or Firm*—Norton Lesser; Larry I. Golden; Richard T. Guttman

[57] ABSTRACT

A single phase electrical panelboard so arranged as to be compatible with three phase systems. Circuit controlling elements may be fitted to the panelboard, the circuit controlling elements being mechanically supported on a first support rail arranged parallel to the bus-bar so as to engage electrically terminals fitted to the bus-bar. Additionally, panelboard is provided with a second support for the circuit controlling elements, the second support being in the form of a flat strip having an edgewise relationship to the bus-bar and located in a base plate at each of its ends.

3 Claims, 13 Drawing Figures

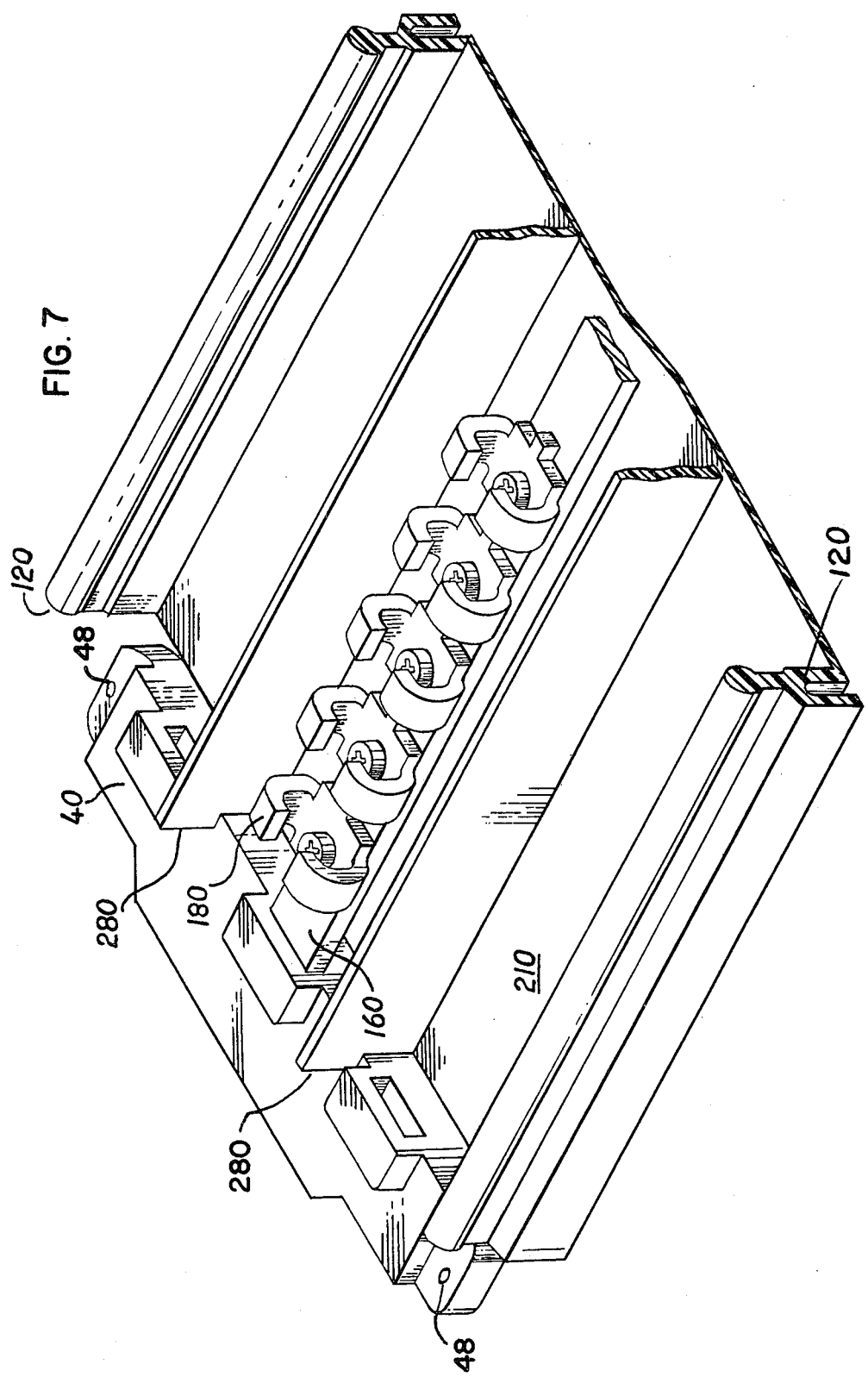

SINGLE PHASE ELECTRICAL PANELBOARD

This invention relates to an electrical panelboard having particular application in single phase power systems.

Our co-pending U.S. Patent Application Ser. No. 913,983 describes an electrical panelboard which is easily adapted to accommodate a number of different wiring arrangements in combination with a number of different arrangements of circuit controlling components.

Although the arrangements described in the said Patent Application and in our earlier U.K. Patent Specification No. 793,885 provided a wide range of three phase arrangements there exists a need for panelboards whereby three phase and single phase systems can be incorporated in one distribution board. It has been possible to modify the panelboards described in the said Application and Patent Specification, but this has not proved an economic approach since the insulating base sections shown in FIGS. 5 and 6 of U.K. Patent Specification No. 793,885 which have to be retained for mechanical reasons are costly to produce whilst having no electrical function as interphase barriers in a single phase configuration.

The panelboards designed solely for single phase application are usually of an entirely different design. One such system is disclosed in our U.K. Pat. No. 1,044,223, but such an arrangement does not lend itself to combination with three phase assemblies in the same distribution board.

It is therefore an object of the present invention to provide a single phase panelboard which is compatible with three phase systems.

According to the present invention there is provided a single phase electrical panelboard including a bus-bar extending longitudinally of said panelboard and supported at each of its ends by an insulating baseplate, a pair of first supports extending parallel to and spaced from said bus-bar each one of said pair being located on respective sides of the bus-bar, a plurality of connectors on said bus-bar adapted to contact electrically a terminal of a circuit controlling device, said circuit controlling device being mountable on either of said supports.

The panelboard may include a pair of second supports extending parrallel to said bus-bar and positioned intermediate said bus-bar and each of said first supports respectively and spaced therefrom, said second supports being adapted to support a body portion of a circuit controlling device mounted on a first support and connected to one of said bus-bar connectors.

Further according to the present invention there is provided a single phase electrical panelboard including a bus-bar extending longitudinally of said panelboard and supported at each of its ends by an insulating base-plate, a pair of first supports extending parallel to and spaced from said bus-bar each one of said pair being located on respective sides of the bus-bar, a plurality of connectors on said bus-bar adapted to contact electrically a terminal of a circuit controlling device, said circuit controlling device being mountable on either of said supports, a pair of second support walls extending parallel to said bus-bar and positioned intermediate said bus-bar and each of said first supports respectively and spaced therefrom, said second support walls having a top edge adapted to support a body portion of a circuit controlling device mounted on a first support and connected to one of said bus-bar connectors, the opposite ends of each of said second support walls being supported in respective base-plates.

In one embodiment the bus-bar and said pair of second supports are supported at spaced positions along their lengths by a plurality of insulating support blocks, and the ends of each of said second supports are located in said base-plates and retained therein by a selected one of a plurality of cover members or terminal support mouldings attached to said base-plate.

Embodiments of the present invention will now be described by way of example with reference to the accompanying drawings in which.

Figure 1:
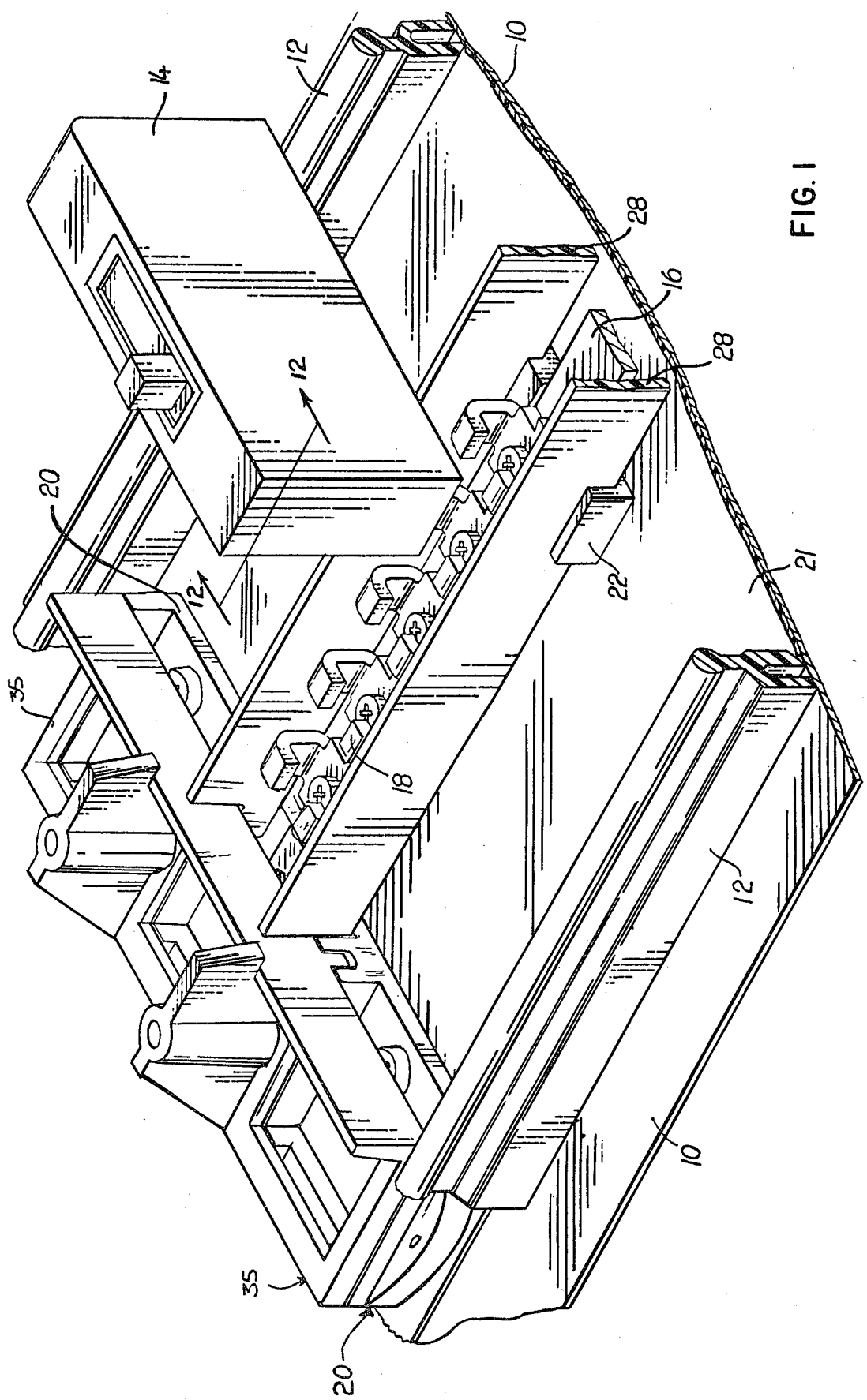
FIG. 1 is a perspective view of one embodiment of a single-phase panelboard according to the present invention.
Figure 8:
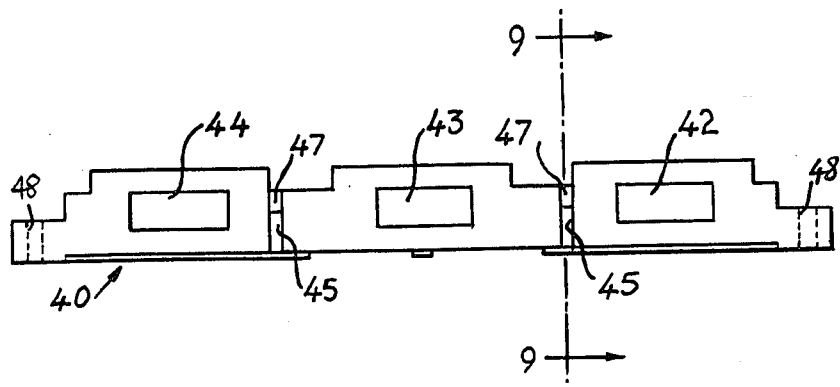
Figure 9:
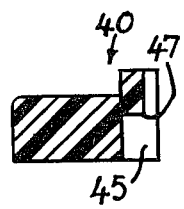
Figure 10:
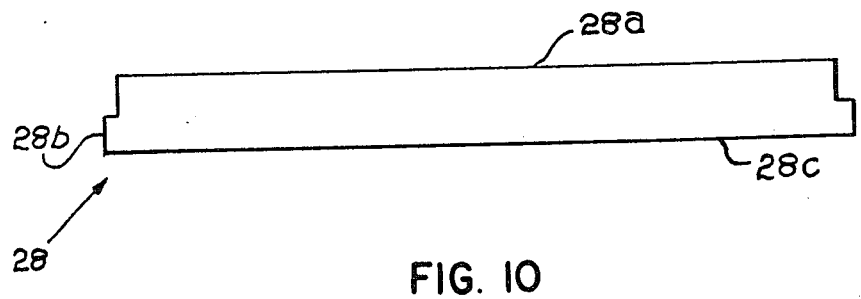
Figure 3:
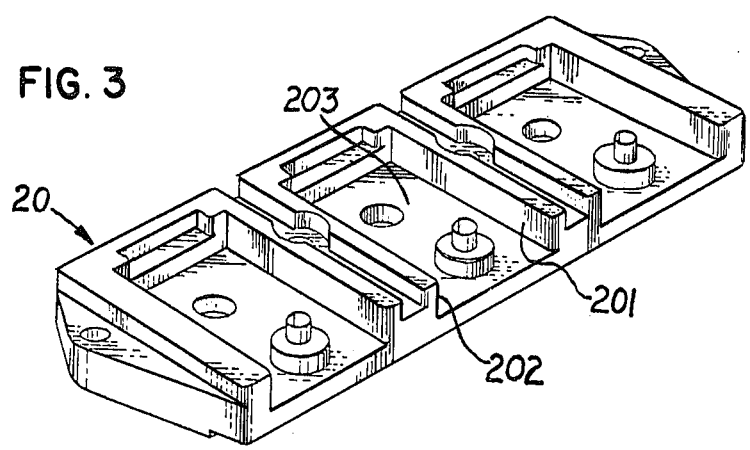
FIG. 3 is a perspective view of the base plate of the panelboard of FIG. 1.
Figure 4:
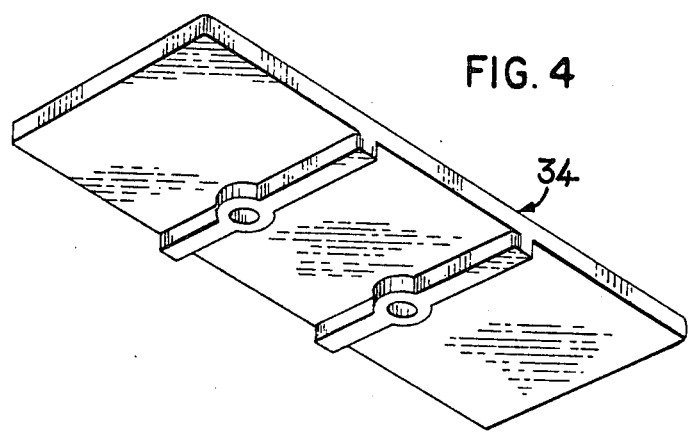
Figure 5:
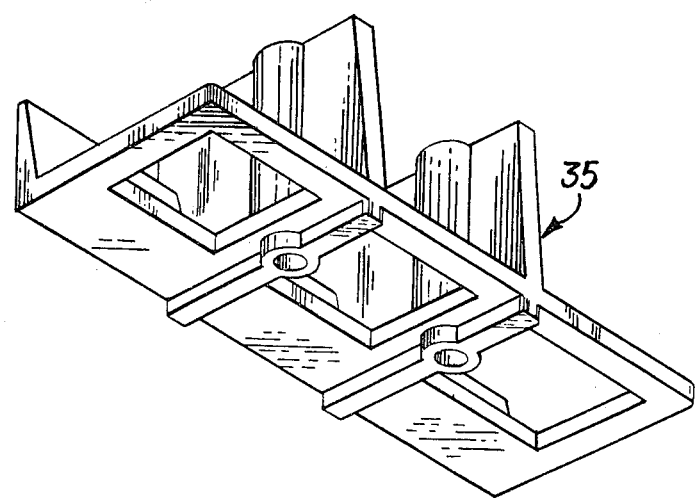
Figure 6:
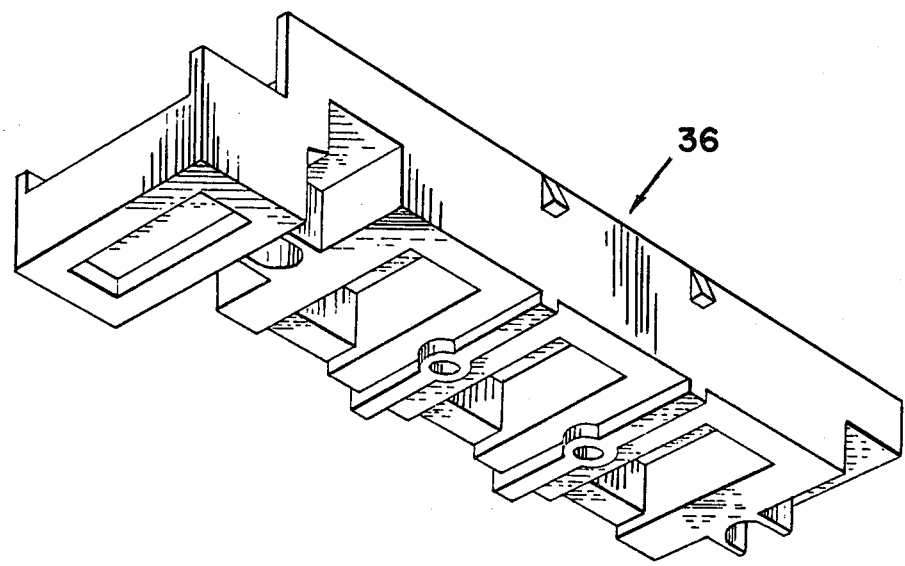
Figure 12:
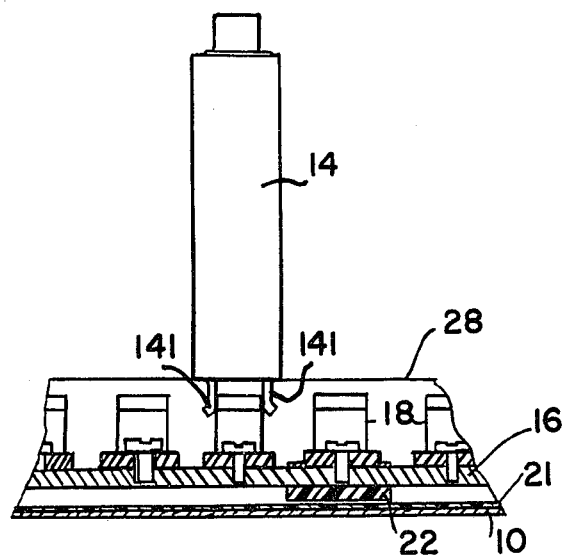
Figure 11:
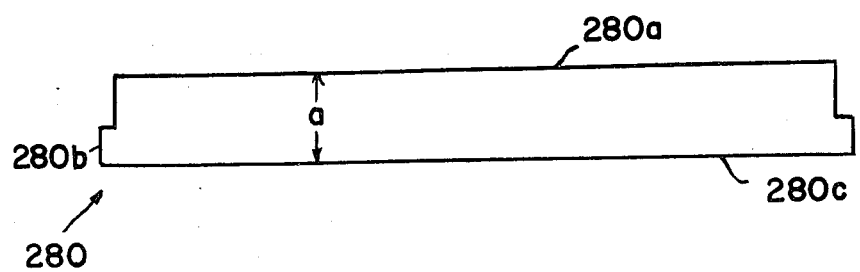

FIGS. 4, 5 and 6 respectively illustrate, in perspective, a cover plate, a terminal barrier and a neutral support suitable for fitment to the base plate of FIG. 3;

FIG. 7 is a perspective view of part of a panelboard made in accordance with the present invention and employing a novel base-plate;

FIG. 8 is a front elevational view of the base plate of FIG. 7;

FIG. 9 is a sectional view taken along the line 9—9 of FIG. 8;

FIGS. 10 and 11 are elevational views of the second circuit breaker supports used in the panelboards of FIG. 1 and FIG. 7 respectively; and FIG. 12 is an elevational sectional view taken in the direction of arrows 12 in FIG. 1:

Referring to FIG. 1, a single phase electrical panelboard comprises a plate 10 on which there is mounted a pair of circuit breaker mounting rails 12 which act as first mechanical supports for a circuit breaker 14 in a manner described in U.K. Patent Specification No. 793,885.

Figure 2A:
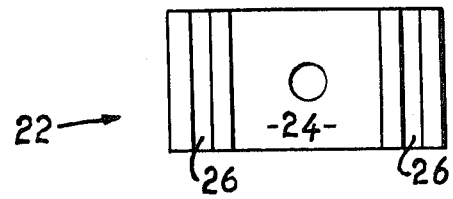
FIG. 2a and 2b are a plan and a sectional elevational view respectively of an insulating support block used in the panelboard of FIG. 1.
Figure 2B:
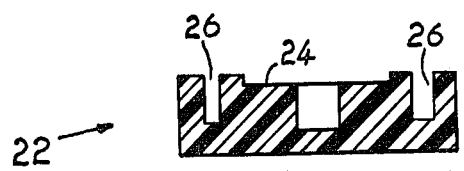

A bus-bar 16 fitted with a plurality of connectors 18 is positioned intermediate and parallel to said mounting rails and is supported at each of its ends by an insulating base-plate 20. The base-plate 20 may be of the type described in our aforementioned co-pending U.K. Application. An insulation sheet 21 is located between the bus-bar 16 and the plate 10 by the base-plates 20 and the mounting rails 12 as described in our said co-pending application. The bus-bar 16 is also supported intermediate its ends on support blocks 22 (FIGS. 2a and 2b).

Each support block 22 is provided with a bus-bar supporting portion 24 and a pair of slots 26, one on each side of the portion 24. Each of the slots 26 is adapted to receive one of a pair of walls or second circuit breaker supports 28 (FIG. 10) the ends of which are cut away at 28b and are located against respective opposed side walls 201,202 of a recess 203 in the base-plate 20 as shown in FIG. 1.

The bus-bar 16 and the second circuit breaker supports 28 are retained in their respective positions in the base-plate 20 by one of a plurality of covers which may be a cover plate 34 (FIG. 4), a terminal barrier 35 (FIG. 5) or a neutral support 36 (FIG. 6) as illustrated and as described in U.S. Patent Application Ser. No. 913,983.

Thus, the topmost edge 28a of the breaker support 28 supports a body portion of the circuit breaker 14 so that its terminal clip 141 accurately engages one of the connectors 18 on the bus-bar 16 as shown in FIG. 12. The support 28 prevents the circuit breaker 14 from being inserted beyond its correct position.

The above described panelboard provides an economical single phase arrangement which is fully compatible with three phase systems.

Referring now to FIG. 7 there is illustrated a panelboard having a bus-bar 160 fitted with a plurality of connectors 180 and positioned intermediate and parallel to a pair of circuit breaker mounting rails 120. The bus-bar is supported at each of its ends by a base-plate 40 provided with spaced apertures 42,43 and 44 designed to accommodate three bus-bars similar to bus-bar 160 only the centre aperture being used in a single phase arrangement. The base-plate 40 may be fixed to the supporting surface by means of screws passing through apertures 48 in the base-plate 40. An insulation sheet 210 is located between the bus-bar 160 and a supporting surface which may be the base of a distribution board. The base-plate 40 is also provided with a pair of slits 45 adapted to receive the ends 280b of the second circuit breaker supports 280 of FIG. 11. The slits 45 are partly covered by a top portion 47 which serves firmly to retain the supports 280 in position. In this arrangement, since the lower edge 280c of the support 280 rests on the insulating sheet 210, the support blocks 22 are not required. In view of this, the dimension 'a' of the support 280 is greater than the corresponding dimension of the support 28. Thus accurate positioning of the circuit breaker supported on the support 280 is ensured.

The base-plate 40 although less versatile than the base-plate 20 eliminates the need for a cover member such as the cover plate 34, the terminal barrier 35 or the neutral support 36. Thus, the base-plate 40 may provide a single phase panelboard as illustrated in FIG. 7 or, may accommodate three bus-bars to provide a distributed three phase system by employing the bus-connectors and insulating base section described in our aforementioned U.K. Patent Specification No. 793,885.

What is claim is:

1. A panelboard assembly comprising:

a panelboard,
   a bus bar extending longitudinally in said panelboard,
   an insulating base plate supporting each end of said bus bar,
   a pair of first support walls extending parallel to and spaced from said bus bar, each one of said pair of first support walls being located on a respective side of the bus bar,
   a plurality of generally U-shaped connectors, each of said connectors having a back portion connected to said bus bar and opposite upwardly extending side legs, each leg having a cantilevered top portion extending towards the other leg in a generally parallel relationship to said bus bar,
   a circuit controlling device mounted on either of said first support walls for pivotal movement towards one of said connectors,
   a spring terminal connected to said circuit controlling device for engagement with a respective top portion of said connector, said circuit controlling device being adapted to abut against said cantilevered top portion to deform said top portion in response to the movement of said device past a predetermined position,
   a pair of second support walls extending parallel to said bus bar and positioned intermediate said bus bar and each of said first supports respectively, said second support walls having a top edge at a selected position to engage said circuit controlling device adjacent said spring terminal in response to said pivoting movement to prevent movement of said device past said predetermined position and thereby prevent deformation of said top portion of said connector.

2. A panelboard assembly as claimed in claim 1 wherein each of said second support walls are supported at opposite ends by the respective base plates.

3. A panelboard assembly as claimed in claim 1, wherein each of said second support walls comprises a generally thin, rectangular, insulating member mounted in edge-on relationship in said panelboard.

* * * * *

UNITED STATES PATENT AND TRADEMARK OFFICE
CERTIFICATE OF CORRECTION

PATENT NO. : 4,167,768

DATED : September 11, 1979

INVENTOR(S) : Andrew P. Baker and Peter E. G. Carpenter

It is certified that error appears in the above-identified patent and that said Letters Patent are hereby corrected as shown below:

Col. 1, lines 4 and 5, change "Our co-pending U.S. Patent Application Serial No. 913,983" to --U.S. Patent No. 4,159,504--.

Col. 2, line 47, "U.K." should be --U.S.--.

Col. 4, line 27, "supports" should be --support walls--.

Signed and Sealed this

Twenty-second Day of January 1980

[SEAL]

Attest:

SIDNEY A. DIAMOND

Attesting Officer

Commissioner of Patents and Trademarks